United States Patent
Yamao (10) Patent No.: US 7,200,220 B1
(45) Date of Patent: Apr. 3, 2007

(54) PORTABLE TELEPHONE MAINTENANCE SERVICE SYSTEM AND MAINTENANCE SERVICE METHOD

(75) Inventor: Hideki Yamao, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/526,391

(22) Filed: Mar. 16, 2000

(30) Foreign Application Priority Data

Mar. 17, 1999 (JP) .................. 11-072381

(51) Int. Cl.
- H04M 3/00 (2006.01)
- G06F 9/00 (2006.01)
- G06F 17/00 (2006.01)
- H04B 1/38 (2006.01)

(52) U.S. Cl. .............. 379/350; 455/410; 455/411; 713/172; 713/183; 726/4; 726/7; 726/25

(58) Field of Classification Search ........ 455/410–411, 455/419, 420, 418, 405, 406; 379/188, 189, 379/190, 126, 127.01, 114.01, 130, 350; 713/168–172, 182–183; 726/4, 7, 25, 35
See application file for complete search history.

(56) References Cited

U.S. PATENT DOCUMENTS

| | | | | |
|---|---|---|---|---|
| 4,630,314 A | * | 12/1986 | Smith | 455/505 |
| 4,811,377 A | * | 3/1989 | Krolopp et al. | 455/550.1 |
| 5,517,549 A | * | 5/1996 | Lee | 455/407 |
| 5,687,216 A | * | 11/1997 | Svensson | 455/412.2 |
| 5,706,330 A | * | 1/1998 | Bufferd et al. | 455/405 |
| 5,748,084 A | * | 5/1998 | Isikoff | 340/568.1 |
| 5,915,225 A | * | 6/1999 | Mills | 455/558 |
| 5,987,609 A | * | 11/1999 | Hasebe | 726/35 |
| 6,064,880 A | * | 5/2000 | Alanara | 455/419 |
| 6,151,493 A | * | 11/2000 | Sasakura et al. | 455/421 |
| 6,157,708 A | * | 12/2000 | Gordon | 379/207.02 |
| 6,304,969 B1 | * | 10/2001 | Wasserman et al. | 713/172 |

(Continued)

FOREIGN PATENT DOCUMENTS

JP 7-193865 7/1995

(Continued)

OTHER PUBLICATIONS

Notification of Reason for Refusal dated Aug. 24, 2004.

*Primary Examiner*—Binh K. Tieu
(74) *Attorney, Agent, or Firm*—Katten Muchin Rosenman LLP (57) ABSTRACT

A portable telephone maintenance service system and maintenance service method for backup control of a portable telephone set, to make it possible to prevent misuse by third persons and to perform data restoration service. A maintenance service center is connected to an exchange network and by a backup control request, that includes the portable telephone number and a code number from the person who lost the portable telephone set, dialing is done from the maintenance service center to the lost portable telephone set. Memory dial data, mail address data, and other data from the memory of the portable telephone set is saved to backup memory and the data in the memory of the portable telephone set is erased. Upon a backup control request when the portable telephone set is recovered, data is downloaded from the backup memory to the memory of the portable telephone set.

12 Claims, 8 Drawing Sheets

U.S. PATENT DOCUMENTS

| | | | |
|---|---|---|---|
| 6,400,958 B1 * | 6/2002 | Isomursu et al. | 455/466 |
| 6,466,660 B1 * | 10/2002 | Merriam | 379/126 |
| 6,480,096 B1 * | 11/2002 | Gutman et al. | 340/5.31 |
| 6,507,914 B1 * | 1/2003 | Cain et al. | 726/35 |
| 6,643,781 B1 * | 11/2003 | Merriam | 726/35 |
| 6,813,498 B1 * | 11/2004 | Durga et al. | 455/456.1 |
| 7,047,426 B1 * | 5/2006 | Andrews et al. | 713/155 |
| 2004/0204021 A1 * | 10/2004 | Cocita | 455/550.1 |
| 2005/0186989 A1 * | 8/2005 | Cocita | 455/558 |

FOREIGN PATENT DOCUMENTS

| | | | |
|---|---|---|---|
| JP | 08-182052 | | 7/1996 |
| JP | 08182052 A | * | 7/1996 |
| JP | 08-251660 | | 9/1996 |
| JP | 08-314805 | | 11/1996 |
| JP | 409252489 A | * | 9/1997 |
| JP | 2000-224660 | | 8/2000 |
| JP | 2002112314 | * | 4/2002 |

* cited by examiner

PORTABLE TELEPHONE MAINTENANCE SERVICE SYSTEM AND MAINTENANCE SERVICE METHOD

FIELD OF THE INVENTION

This invention concerns a portable telephone maintenance service system and maintenance service method that by remote control prevents a third person from misusing a portable telephone due to loss, theft, etc.

BACKGROUND OF THE INVENTION

Advances in technology have made portable telephone sets smaller and lighter, have made them able to store various kinds of data, and have made them portable enough to be carried in, for example, a pocket. On the other hand, this has created more opportunities for them to be lost through dropping or forgetting, or for them to be stolen by third persons. When a third person uses a portable telephone set that is thus lost or stolen, its legitimate owner may be billed and the various data stored in it may be misused. Therefore it is desirable to have a way to prevent the misuse of a portable telephone set that gets lost or stolen.

A dial lock function using a code number is known as a previous security function for portable telephone sets. That is, if a dial lock function is set with a code number, when this portable telephone set is to be used, one must release the dial lock function by inputting the code number, thus making it possible to prevent a third person who does not know this code number from making calls.

Means are known whereby if a portable telephone set is lost or stolen, the owner of the portable telephone set contacts a communications carrier's exchange station, etc. from a general telephone set and requests, using the portable telephone set's code number, that outgoing or incoming calls not be accepted, so that thereafter outgoing and incoming calls of the portable telephone set are not accepted at the exchange station that controls portable telephone set incoming and outgoing calls.

Means have also been proposed (for example, publication of unexamined patent application H7-193865 [1995]) whereby when the rightful owner of a lost or stolen portable telephone set contacts the communications carrier or exchange station, he arranges it so that calls originating from the portable telephone set are not accepted, and transmits remote control data to the portable telephone set, and the portable telephone set receives and recognizes this remote control data, then the various stored data is prohibited from being read, various data is erased, an alarm tone is generated, and notification is given concerning the location of the portable telephone set.

By having a memory, a portable telephone set can remember input-set data such as many telephone numbers and mail addresses. This creates the problem that when this portable telephone set is lost or stolen, the finder can make malicious calls that reference the stored content, even if the dial lock function is set. In this case, as stated above, this misuse can be avoided by contacting the communications carrier and performing control such as erasing the stored content of the stolen portable telephone set.

But when the lost or stolen portable telephone set comes back to its original owner, it is impossible to restore the various data that has already been erased. In that case, the various data must be input and set again. Or it could be restored by backing it up beforehand. In that case, the backup can be done by connection with a computer, but backing up cannot be done with the portable telephone set itself.

The purpose of this invention is to provide a maintenance service center and realize portable telephone set security functions and backup functions.

SUMMARY OF THE INVENTION

The portable telephone maintenance system of this invention has—in a system that performs communication between a portable telephone set 1 and a general telephone set 5 via an exchange network 3—a maintenance service center 4 that is accessible via said exchange network 3 from portable telephone set 1 and general telephone set 5, and this maintenance service center 4 has a backup memory 24 and a host processor 23 or other controller that, at the backup control request from the owner of portable telephone set 1, performs control to save the portable telephone set's memory dial data, mail address data, and other input-set data in backup memory 24 and erase said data stored in the portable telephone set's memory 17.

The controller of maintenance service center 4 has a structure in which said memory dial data, mail address data, and other input-set data saved in backup memory 24 is downloaded to said portable telephone set at the backup control request from the owner of the portable telephone set.

Also, a maintenance service center 4 is provided in a system that performs communication between portable telephone set 1 and general telephone set 5 via exchange network 3. This includes a process in which, at the backup control request from the owner of said portable telephone set who has lost the portable telephone set, said portable telephone set is accessed from said maintenance service center 4, said portable telephone set's memory dial data, mail address data, and other input-set data is saved to backup memory 24, and said data stored in said portable telephone set's memory 17 is erased.

It can include a process in which, at the backup control request, including code number and portable telephone number, from the owner of said portable telephone set who has lost the portable telephone set, maintenance service center 4 performs dialing according to said portable telephone number. If said portable telephone set is busy or is waiting, the memory dial data, mail address data, and other input-set data stored in said portable telephone set's memory 17 is saved to backup memory 24 of said maintenance service center 4 with a control number added to it, said data stored in said portable telephone set's memory 17 is erased, and said portable telephone set's owner is notified of said control number.

It can include a process in which, at the backup control request, including code number, portable telephone number, and control number, from the owner of said portable telephone set who has lost the portable telephone set, said maintenance service center 4 performs dialing according to said portable telephone number, and downloads to memory 17 of said portable telephone set the memory dial data, mail address data, and other data saved to said backup memory 24.

It can include a process in which a time period is set for storing said portable telephone set's memory dial data, mail address data, and other data in backup memory 24 of maintenance service center 4, and it is erased after the elapse of said time period.

DETAILED DESCRIPTION

Figure 1:
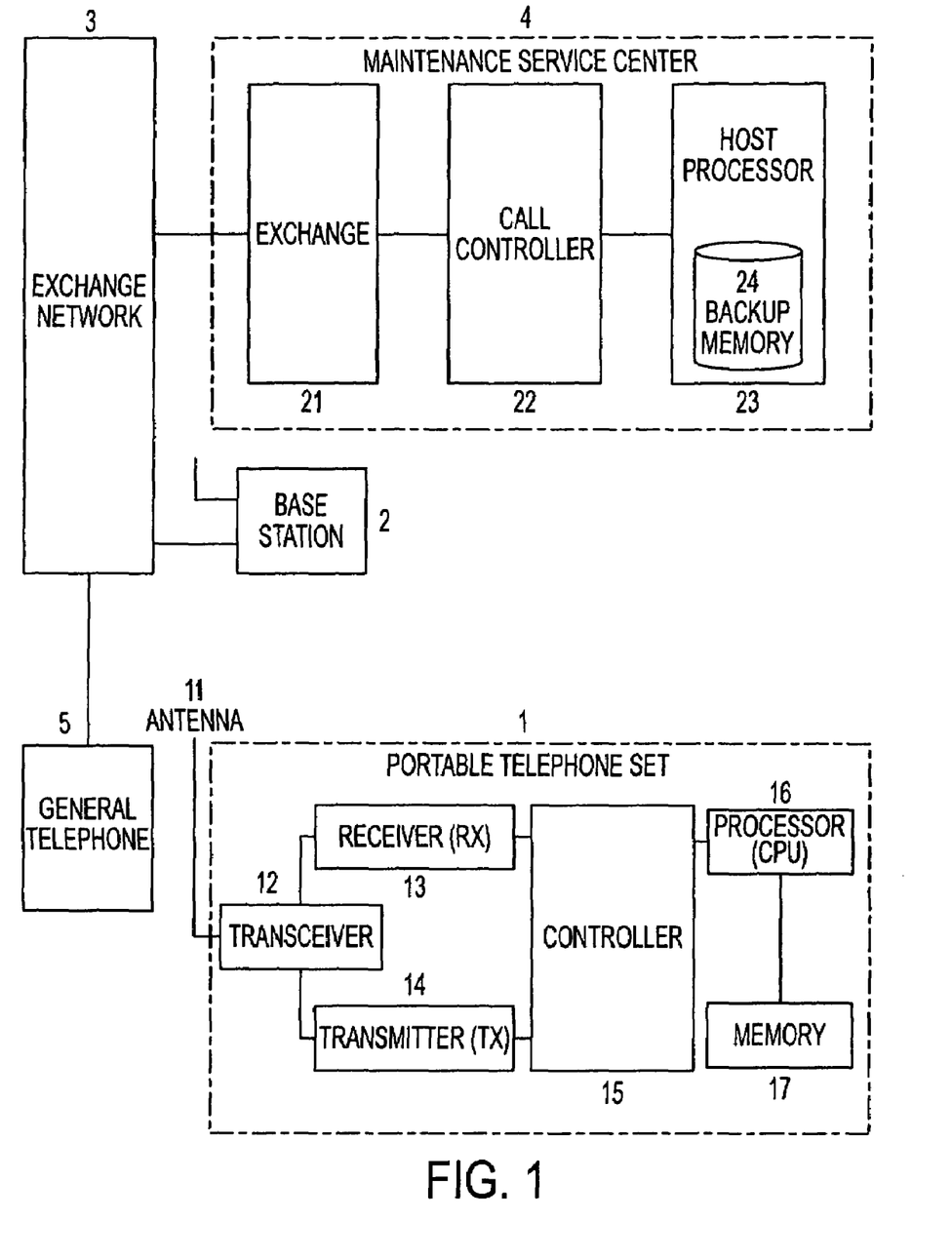
FIG. 1 is a diagram for explaining an embodiment of this invention.

FIG. 1 is an explanatory diagram of an embodiment of the invention; 1 is a portable telephone set, 2 is a base station, 3 is an exchange network, 4 is a maintenance service center, 5 is a general telephone set, 11 is an antenna, 12 is a transceiver, 13 is a receiver (RX), 14 is a transmitter (TX), 15 is a controller, 16 is a processor (CPU) that controls the parts, 17 is a memory that stores memory dial data, mail address data, and other input-set data, 21 is an on-premises exchange or other exchange, 22 is a call controller, 23 is a host processor, and 24 is a backup memory. The various keys and display units of portable telephone set 1 for dialing, etc. are not shown in the diagram.

As in a conventional example, portable telephone set 1 has a transmission-reception function that includes receiver 13 or transmitter 14, and it can perform communication with other telephone sets, etc. via base station 2. When the power is on, it stands by in wait state, and in response to a call from another telephone set it executes a call by a control channel from base station 2, confirmation processing is done by a control channel between base station 2 or its higher-level station and portable telephone set 1, and if it is the correct portable telephone set, there is a call tone sound, and by answering it, a communication path is formed, and a conversation can be conducted by the conversion channel.

If various control information is received by the control channel, control corresponding to the control information is carried out by controller 15 or processor 16. In that case, if backup control request information is included, control is done so that there is no transition to the step of sounding a call tone.

Memory 17 of portable telephone set 1 can store memory dial data or mail address data, etc. under the control of processor 16 according to the input operation of dial buttons, etc. not shown in the diagram. The content of this memory 17 can be displayed, under the control of processor 16, on a liquid crystal panel or other display unit not shown in the diagram. Also, this portable telephone set 1 can be connected to exchange network 3 via a wireless circuit with base station 2.

Also, maintenance service center 4, which contains exchange 21, call controller 22, and host processor 23, etc., is connected to exchange network 3. Backup control of the portable telephone set is done by a controller that includes call controller 22 and host processor 23. Backup memory 24 of host processor 23 can be constituted by a magnetic disk drive, etc., and the various data stored in memory 17 of portable telephone set 1 can be saved, and the various saved data can be downloaded to memory 17 of portable telephone set 1.

A call can be made from portable telephone set 1 to maintenance service center 4 to request backup service. Or if portable telephone set 1 is lost or stolen, a call can be made from general telephone set 5 to maintenance service center 4 to request backup and erasure of the various data in the portable telephone set 1. At maintenance service center 4, when host processor 23 identifies a backup control request that includes a portable telephone number and a code number, etc., call control of portable telephone set 1 is made via call controller 22, exchange 21, exchange network 3, and base station 2, and if the portable telephone set is in wait state or is busy, a backup control signal is sent out, and when processor 16 of portable telephone set 1 recognizes this backup control signal, it sends out to maintenance service center 4 the memory dial data, mail address data, and other input-set data stored in memory 17, without making the transition to the step for sounding the call tone, etc.

Host processor 23 of maintenance service center 4 stores in backup memory 24—together with the number of portable telephone set 1, the code number, etc.—the memory dial data, mail address data, and other input-set data sent by portable telephone set 1. And when portable telephone set 1 returns to its rightful owner, the memory dial data and mail address data is downloaded from backup memory 24 of maintenance service center 4 to memory 17 of the portable telephone set 1. Thus the rightful owner of portable telephone set 1 is able to use it as previously, without re-inputting the memory dial data and mail address data.

Figure 2:
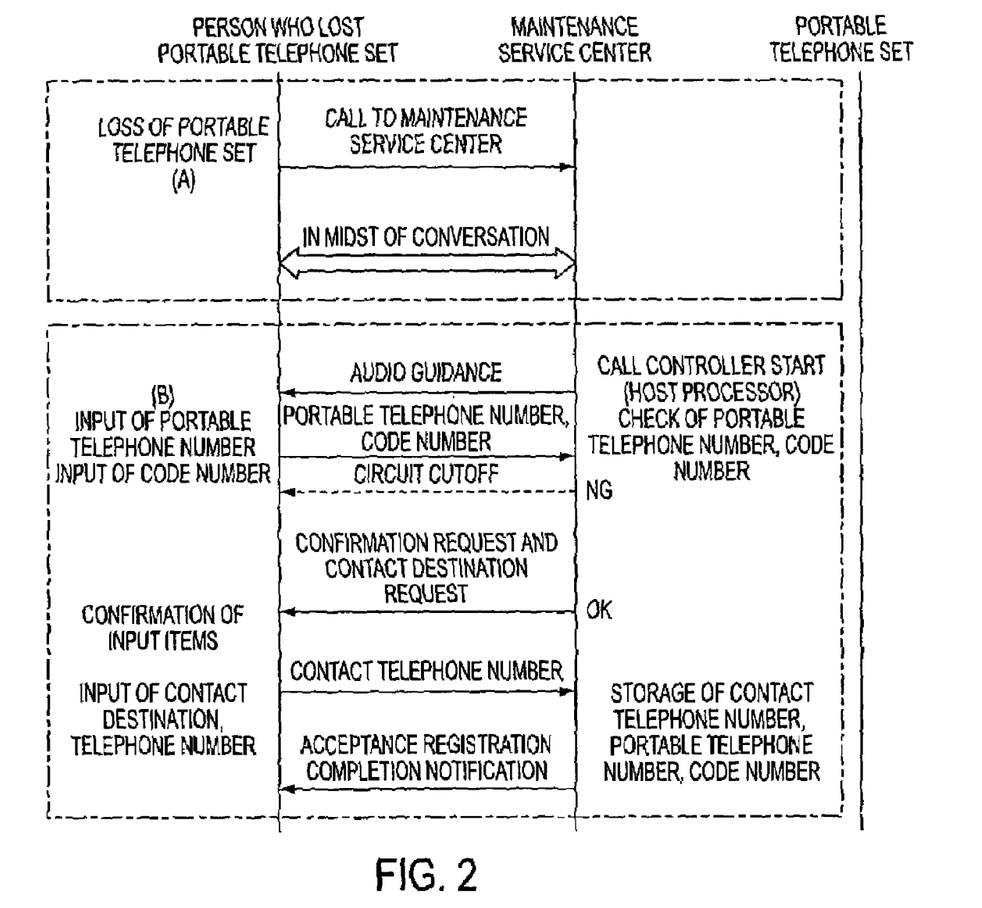
FIG. 2 is a diagram for explaining the sequence of an embodiment of this invention.
Figure 3:
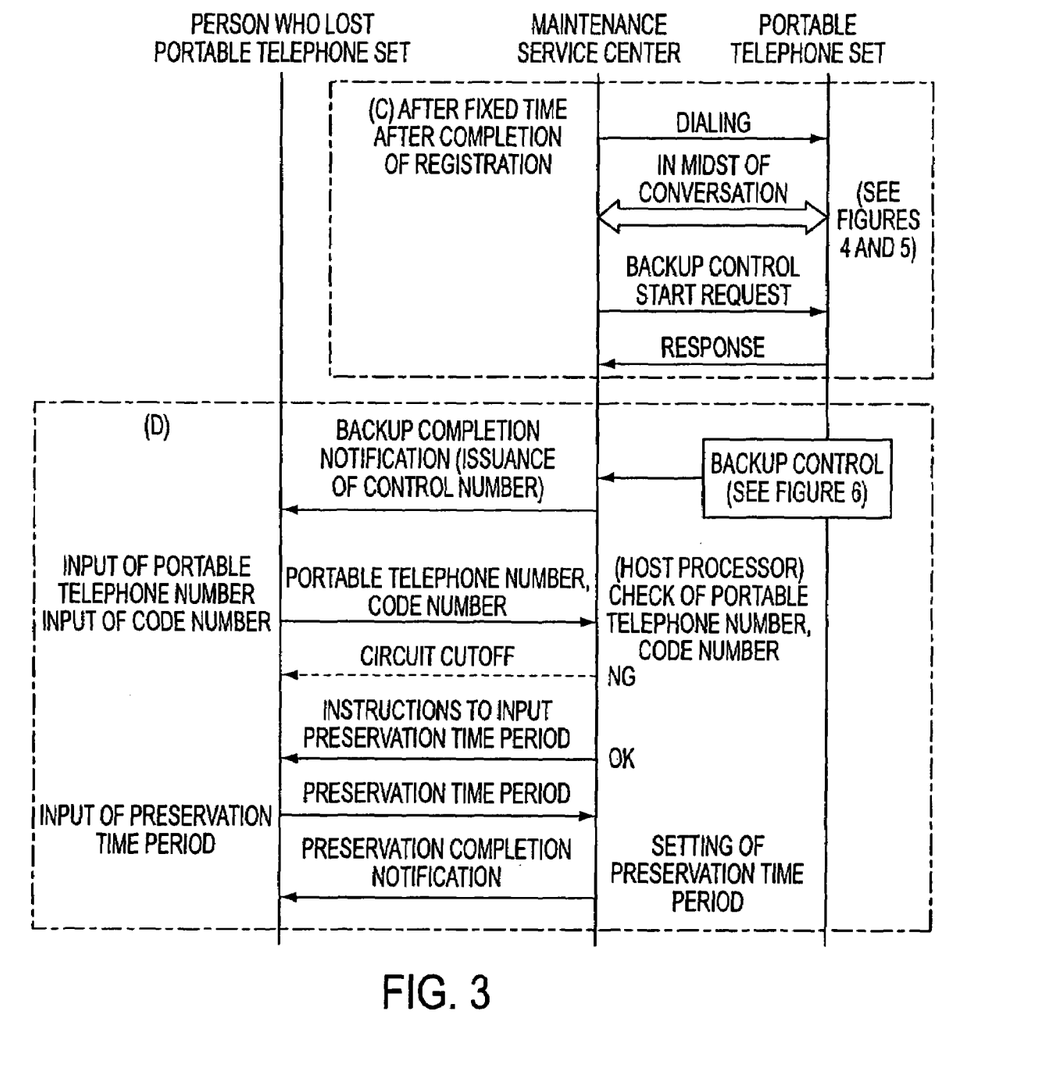
FIG. 3 is a diagram for explaining the sequence of an embodiment of this invention.

FIGS. 2 and 3 are diagrams for explaining the sequence of an embodiment of this invention. They show the relationship between the person who has lost the portable telephone set, maintenance service center 4, and portable telephone set 1. These diagrams show the processing (A) to (D) when a backup service request is made to maintenance service center 4 after portable telephone set 1 has been lost.

The person who lost the portable telephone set first calls maintenance service center 4 from a general telephone set, such as a fixed telephone set in his own home, and by the automatic response, etc. of maintenance service center 4, a path is established via exchange network 3, and the conversion state results. That is, processing (A) is executed.

Call controller 22 of maintenance service center 4 sends out audio guidance. The person who lost the portable telephone set inputs the portable telephone set number and code number as instructed by the audio guidance. The maintenance service center performs a check of the portable telephone number and code number in host processor 23. For example, it performs a check of the number of digits, and it checks whether the received portable telephone number is correct by making a comparison with the control station, etc. that registers the position of the portable telephone set.

If the result of the check is no good (NG), a circuit cutoff request can be sent out, either by sending out a circuit cutoff request immediately or by repeating the input operation for a prescribed number of times, such as three times. If the check is okay (OK), a confirmation request or a contact destination request is made to the person who lost the portable telephone set.

The person who lost the portable telephone set confirms the input items of the portable telephone number and code number from maintenance service center 4 and inputs the contact destination telephone number. Maintenance service center 4 stores this contact destination telephone number, portable telephone number, and code number in backup memory 24 of host processor 23 and informs the person who lost the portable telephone set of the completion of reception registration. Such processing (B) is executed next after aforesaid processing (A).

Figure 4:
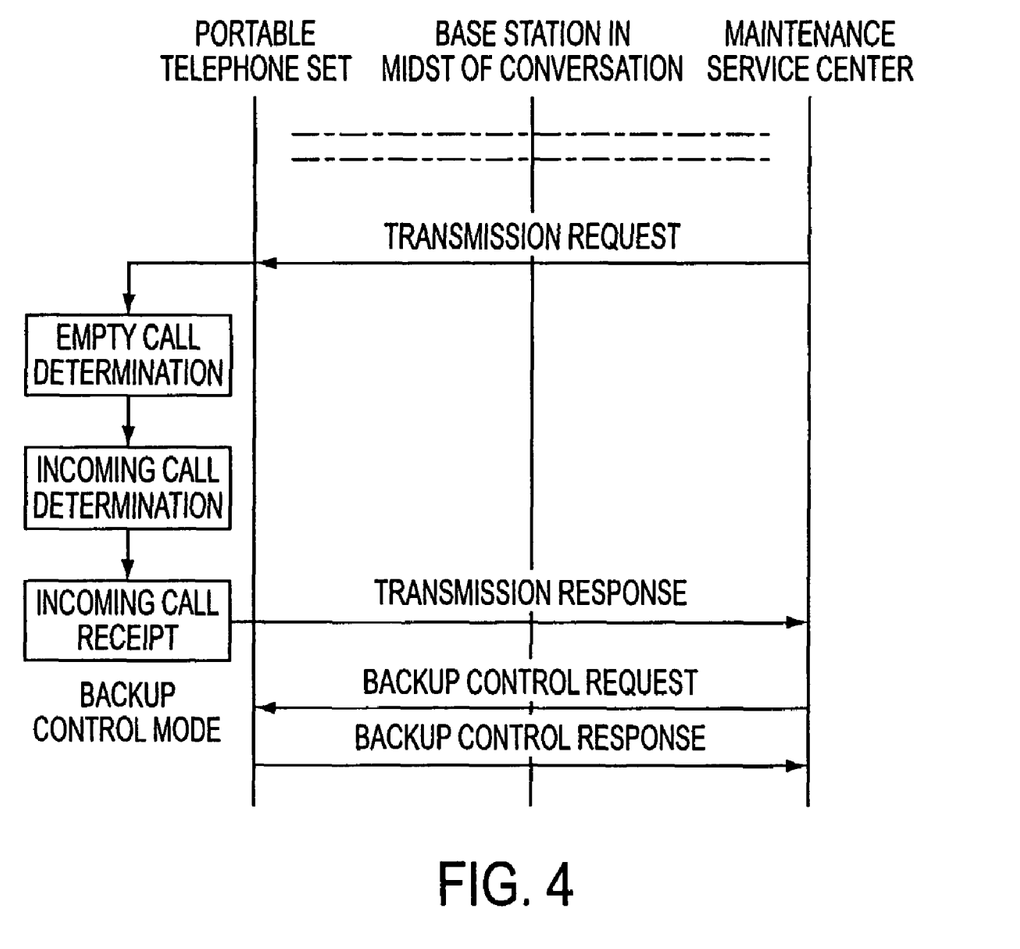
FIG. 4 is a diagram for explaining the sequence of backup control during conversation of an embodiment of this invention.
Figure 5:
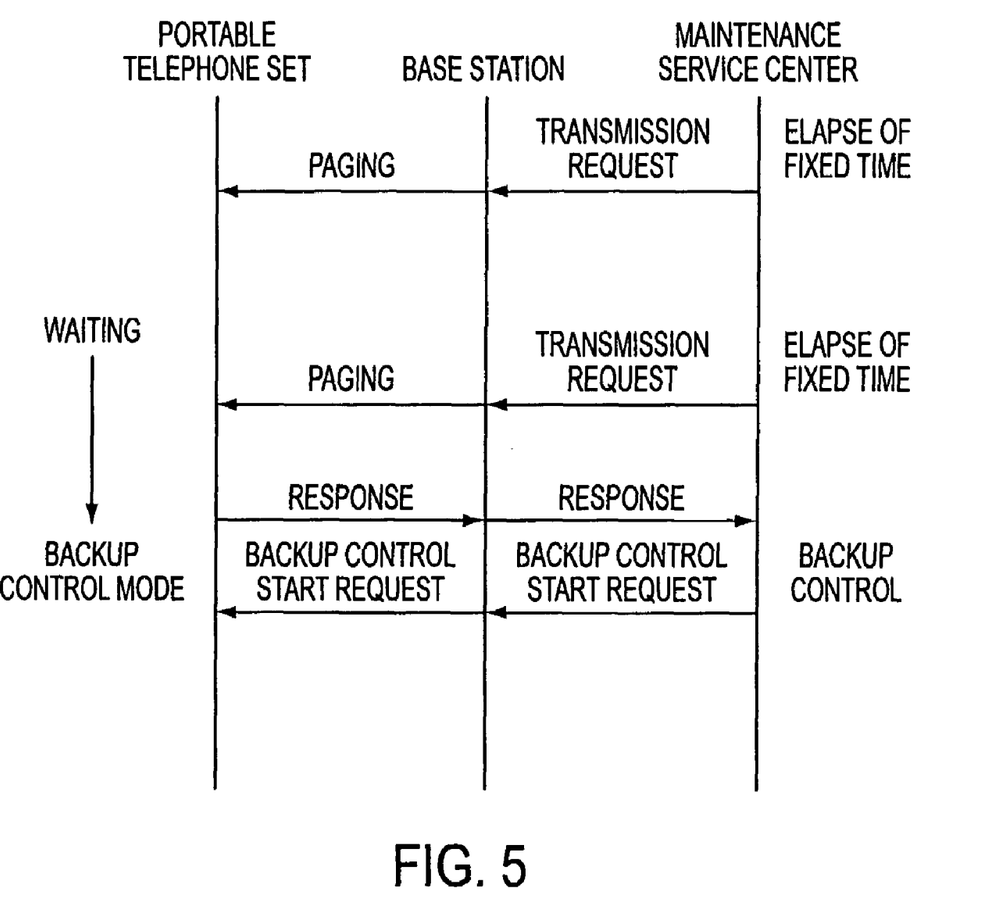
FIG. 5 is a diagram for explaining the sequence of backup control during wait state of an embodiment of this invention.

After a fixed time following completion of registration, maintenance service center 4 performs the dialing that corresponds to the portable telephone number stored in backup memory 24. If the portable telephone set if in the midst of conversation, the processing shown in FIG. 4 is done, and if it is in wait state, the processing shown in FIG. 5 is done. Then it will be in the midst of conversation. This state of being in the midst of conversation indicates the state in which control information can be communicated between maintenance service center 4 and the portable telephone set by a control channel, etc. Then a backup control start request is sent out from maintenance service center 4. The portable telephone set sends out to maintenance service center 4 a corresponding response. After the above processing (C) is executed, processing (D) is executed.

Figure 6:
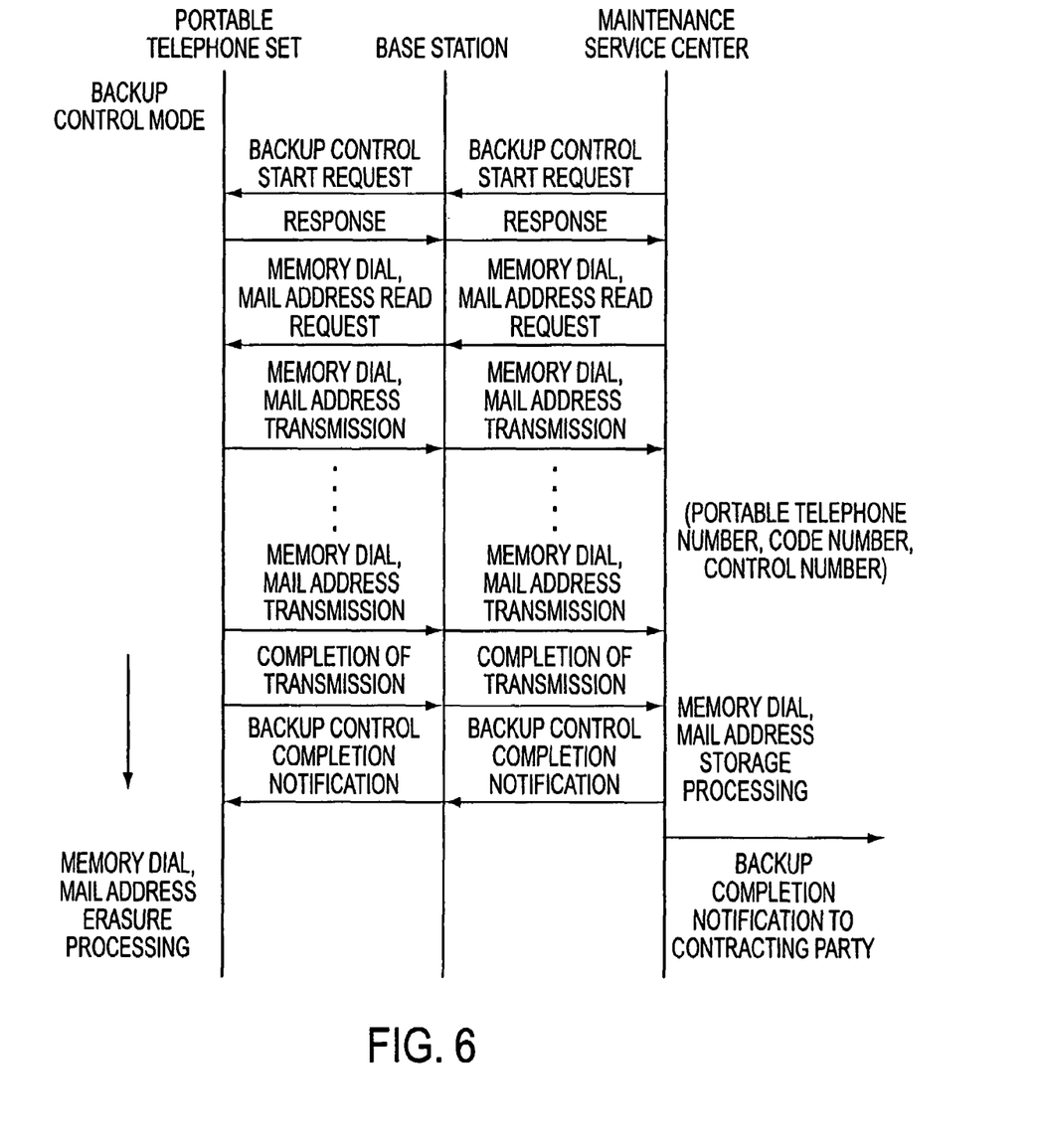
FIG. 6 is a diagram for explaining the sequence of backup control of an embodiment of this invention.

That is, in the portable telephone set, the backup control shown in FIG. 6 is carried out in accordance with the backup control start request from maintenance service center 4. When completion of the backup is confirmed, a call is made using the contact destination telephone number of the person who lost the portable telephone set that is stored in backup memory 24, notification of completion of backup is made, notification of the control number of the backed-up data is made, and a request is made for input of the portable telephone number and code number whose registration has been received. The person who lost the portable telephone set inputs the portable telephone number and code number in accordance with this request.

Maintenance service center 4 makes a comparison check of the portable telephone number and code number stored in backup memory 24, and if it is no good (NG), the circuit is cut off or repeated input operation is made to be carried out, and if it is still NG despite input for a prescribed number of times, such as three times, the circuit is cut off. If the check is okay (OK), preservation time period input instructions are given.

The person who lost the portable telephone set inputs the period of time for which preservation is desired, such as six months or one year. Maintenance service center 4 sets this preservation period and sends out notification of completion of preservation. When this preservation period ends, the data preserved in backup memory 24 is erased. If the preservation period for the backed-up data is preset in a fixed way, inputting of this preservation period may be omitted. Also, control may be done in which a fee corresponding to this preservation period is charged.

FIG. 4 is a diagram for explaining the sequence of the during-conversation backup control of an embodiment of this invention. Maintenance service center 4 issues a transmission request (callout instruction) to the portable telephone set via base station 2 based on the portable telephone number whose registration has been received. With a multicall portable telephone set, an empty call determination and arriving call determination is made while it is in the midst of transmission (in the midst of conversation), and if the determination is normal (incoming call acceptance OK), when a calling response (callout response instruction) is sent out to the maintenance service center, it is transferred to maintenance service center 4 via base station 2.

Maintenance service center 4 sends a backup control request to the portable telephone set via base station 2. The portable telephone set goes into backup control mode, and a backup control response is sent to the maintenance service center.

FIG. 5 is a diagram for explaining the sequence of backup control of an embodiment of this invention while in the wait state. Maintenance service center 4 makes a transmission request to base station 2 based on the registration-received portable telephone number, and base station 2, not being in the midst of conversation, performs paging. If the portable telephone set is unable to respond to this—for example, if it is outside the service network—then maintenance service center 4, after the elapse of a given length of time, once again makes a transmission request to base station 2, and base station 2 performs paging.

If at this time the portable telephone set is in wait state, it will make a response, so maintenance service center 4 makes a backup control start request. Because of this, the portable telephone set makes a transition from the wait state into backup control mode.

FIG. 6 is a diagram for explaining the sequence of backup control in an embodiment of this invention. Upon a backup control start request from maintenance service center 4, the portable telephone set goes into backup control mode, and when the response is sent out to maintenance service center 4 via base station 2, maintenance service center 4 sends out to the portable telephone set, via base station 2, a request to read the memory dial data, mail address data, and other input-set data.

Under the control of processor (CPU) 16 (see FIG. 1), the portable telephone set reads the memory dial data, mail address data, and other input-set data stored in memory 17 and transmits it by transmitter 14. If the transmission of all the data cannot be completed in a single transmission, this processing is repeated until the transmission is completed.

And when the transmission from the portable telephone set of the memory dial data, mail address data, and other input-set data is completed, maintenance service center 4, upon notification of completion of the transmission, saves the memory dial data, mail address data, and other data, together with the portable telephone number, code number, and control number that were previously registration-accepted, into backup memory 24 of host processor 23, and transmits to the portable telephone set, via base station 2, a notification of completion of backup control.

Upon this notification of completion of backup control, the portable telephone set, under control of processor 16, erases the memory dial data, mail address data, and other data stored in memory 17. Also, a notification of completion of backup is issued from maintenance service center 4 to the contracting party who requested backup control (the contact telephone number of the person who lost the portable telephone set).

Figure 7:
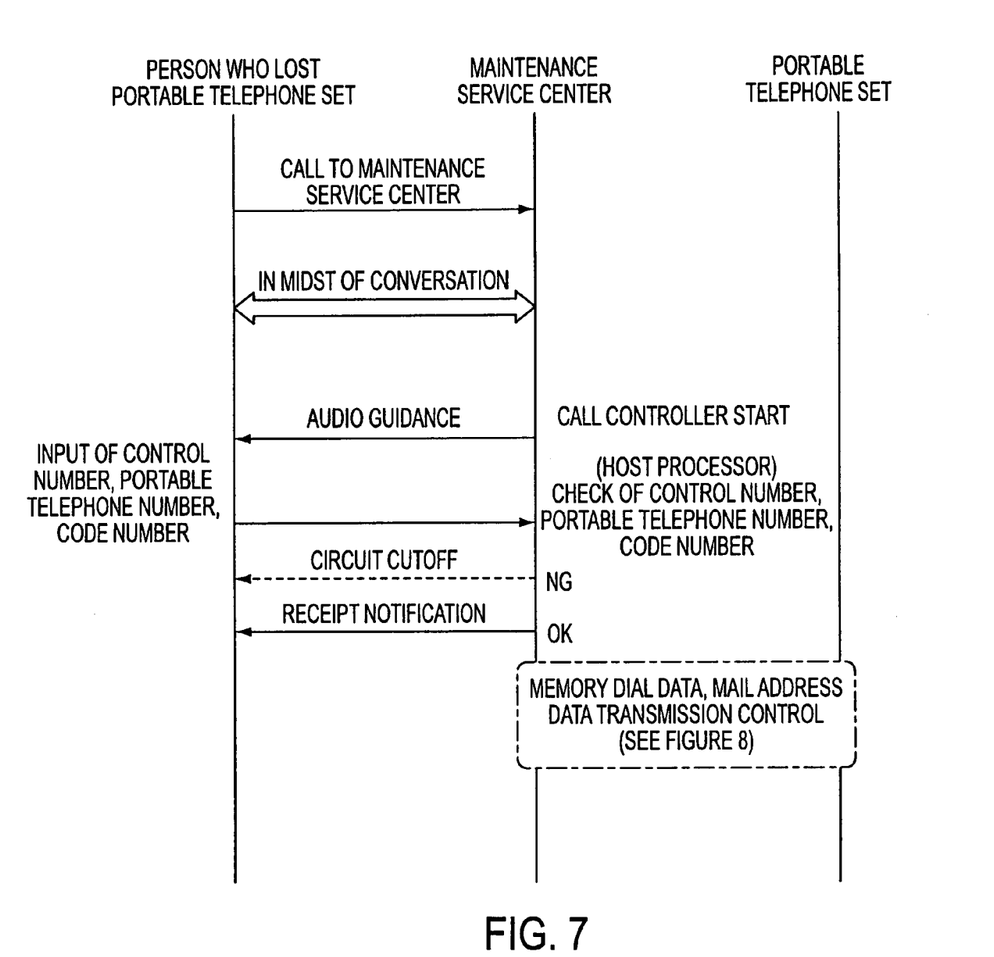
FIG. 7 is a diagram for explaining the sequence of backup control of an embodiment of this invention.

FIG. 7 is a diagram for explaining the sequence of backup control in an embodiment of this invention. It shows the processing that takes place when a lost or stolen portable telephone set returns to the person who lost it. The person who lost the portable telephone set makes a call to a maintenance service center 4 from a general telephone set, and upon the response of maintenance service center 4 it goes into the midst of conversation, and under control by the call controller of maintenance service center 4, audio guidance is sent out, and based on this, one inputs the control number, the portable telephone number, and the code number.

Maintenance service center 4, in host processor 23, compares the control number, portable telephone number, and code number from the person who lost the portable telephone set with the content stored in backup memory 24, and if it is NG, either immediately cuts off the circuit or has the input operation repeated for the prescribed number of times, such as three times, and cuts off the circuit if it is still NG. If the check is OK, it issues a reception notification. Then it carries out transmission control of the memory dial data, mail address data, and other data to the portable telephone set.

Figure 8:
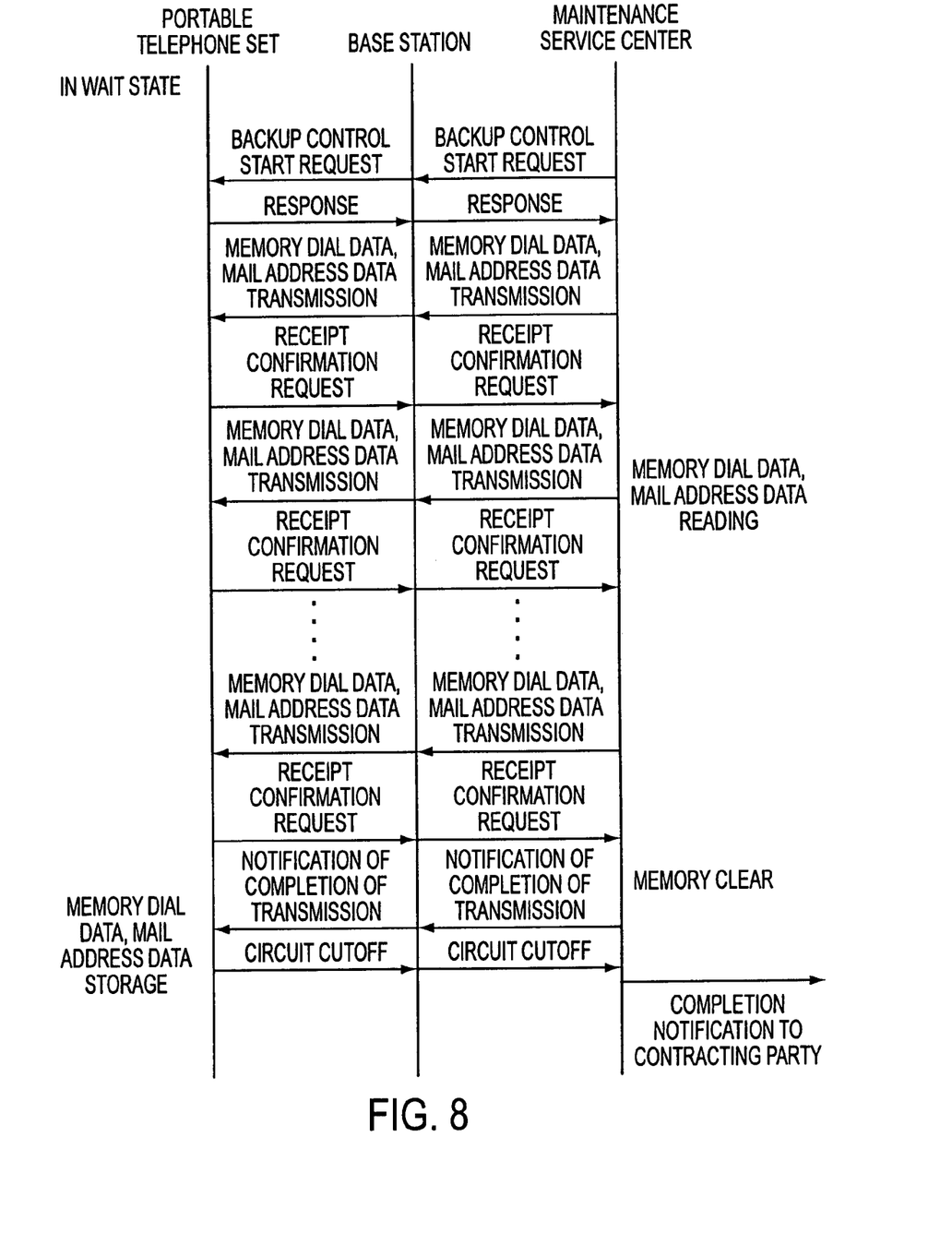
FIG. 8 is a diagram for explaining the sequence of backup control of an embodiment of this invention.

FIG. 8 is a diagram for explaining the sequence of backup control in an embodiment of this invention. It shows the transmission control processing of the memory dial data, mail address data, and other data of FIG. 7. A transmission request is issued from maintenance service center 4 to the portable telephone set via base station 2, and upon the response of the portable telephone set, a backup control start notification is issued. When a response is sent out from the portable telephone set in response to this, the memory dial data, mail address data, and other saved data is read from backup memory 24 of maintenance service center 4 and is transmitted.

The portable telephone set, upon normal reception, sends out a reception confirmation response, and maintenance service center 4 reads the next memory dial data, mail address data, and other data from backup memory 24 and transmits it. This is repeated, and when all the memory dial data, mail address data, and other data held in backup memory 24 has been read and transmitted, backup memory 24 is cleared, and a notification of completion of transmission is sent out. Upon notification of completion of transmission, the portable telephone set, under the control of processor 16, stores the memory dial data, mail address data, and other data into memory 17 and sends out a circuit cutoff request. Maintenance service center 4 issues a notification of completion to the contracting party (the person who lost the portable telephone set).

By the above-described backup control start request, etc., a transmission can be made to the portable telephone set via a control channel, and the portable telephone set, by reception identification by its processor 16 or controller 15, can go into backup control mode. Also, in the erasure processing of the memory dial, mail address, and other data in FIG. 6, by receiving and identifying the backup control completion notification from maintenance service center 4, the memory dial data, mail address data, and other data stored in memory 17 is erased.

The format of the data when the aforesaid memory dial data, mail address data, and other data is transferred from the portable telephone set maintenance service center 4 and is saved, and when the memory dial data, mail address data, and other data read from backup memory 24 of maintenance service center 4 is transferred to the portable telephone set and is downloaded, it can be transferred by selecting any of various already known formats, such as fixed-length packet or variable-length packet.

The backup control processing shown in FIGS. 7 and 8 illustrates the case in which the person who lost the portable telephone set calls maintenance service center 4 from a general telephone set, but he may also use the recovered portable telephone set. In this case, when a call processing stop for the lost or stolen portable telephone set is requested, calls to maintenance service center 4 are also disabled, and it is done by a call from a general telephone.

A maintenance service center 4 is provided, data that is input-set in lost or stolen portable telephone set 1 is saved in backup memory 24 of maintenance service center 4, and when the portable telephone set 1 returns to its rightful owner, the data saved in backup memory 24 can be downloaded to memory 17 of portable telephone set 1; thus there are the advantages that misuse of a lost or stolen portable telephone set 1 is prevented, and when it is recovered, there is no need to go through an operation for inputting and setting the various data again, because one need merely download into memory 17 of portable telephone set 1 the various data that has been saved in backup memory 24.

What is claimed is:

1. A communication system between a portable telephone set having a memory and a general telephone set via an exchange network, comprising:
   a portable telephone service system having
   a maintenance service center that is accessible via said exchange network from said portable telephone set and said general telephone set, and
   said maintenance service center including a backup memory and a controller, wherein a backup control request, including a code and a number of said portable telephone set that are entered by an authorized person having the code and the number of said portable telephone set, performs control to save said portable telephone set's memory dial data, mail address data, and other input-set data in said backup memory and erase said data stored in said portable telephone set's memory and said maintenance service center further includes a dialing unit configured to dial a number of said portable telephone set to connect with said portable telephone via the exchange network.

2. The communication system as described in claim 1 wherein, said controller of said maintenance service center has a structure in which said memory dial data, mail address data, and other input-set data saved in said backup memory is downloaded to said portable telephone set at the backup control request from the owner of the portable telephone set, wherein the authorized person includes the owner of the portable telephone set.

3. A maintenance service method comprising:
   providing a maintenance service center in a system that performs communication between a portable telephone set having a memory and a general telephone set via an exchange network, said maintenance service center including a backup memory, and
   receiving a backup control request, including a code and a number of said portable telephone set that are entered by an authorized person having the code and the number, of said portable telephone set wherein said portable telephone set is accessed from said maintenance service center by a dialing unit dialing a portable telephone number of said portable telephone to connect with said portable telephone set, said portable telephone set's memory dial data, mail address data, and other input-set data is saved to said backup memory, and said data stored in said portable telephone set's memory is erased.

4. A maintenance service method as described in claim 3 wherein upon receiving the backup control request, said maintenance service center performs dialing according to said potable telephone number, and if said portable telephone set is busy or is waiting, the memory dial data, mail address data, and other input-set data stored in said portable telephone set's memory is saved to the backup memory of said maintenance service center with a control number added to it, said data stored in said portable telephone set's memory is erased, and said portable telephone set's owner is notified of said control number.

5. A maintenance service method as described in claim 3 wherein upon receiving the backup control request, including code number, portable telephone number, and control number, said maintenance service center performs dialing according to said potable telephone number, and downloads to the memory of said portable telephone set the memory dial data, mail address data, and other data saved to said backup memory.

6. A maintenance service method as described in claim 3, wherein a time period is set forth for storing said portable telephone set's memory dial data, mail address data, and other data in said backup memory of said maintenance service center, and it is erased after elapse of said time period.

7. The maintenance service method of claim 3, wherein
the authorized person includes an owner of the portable telephone set, and wherein
the owner initiates a backup control request by entering the code and the number of said portable telephone set from another telephone set or communication device.

8. A memorizing apparatus being able to communicate with a portable telephone via base stations in a network, comprising:
a dialing unit dialing a number of said portable telephone to connect with said portable telephone via one of said base stations; and
a memory storing information transmitted by said portable telephone in response to a backup request, including a code and a number of said portable telephone that are entered by an authorized person of said portable telephone, from said memorizing apparatus.

9. The memorizing apparatus of claim 8, wherein a person initiates a backup request by entering the code and the number of said portable telephone set from another telephone set or communication device.

10. A portable telephone being able to communicate with a memorizing apparatus via base stations in a network, comprising:
a receiving unit receiving an incoming call via one of said base stations, said incoming call from said memorizing apparatus in response to a backup control request, which includes a code and a number of said portable telephone; and
a transmitting unit transmitting information to said memorizing apparatus having a memory for memorizing said information in said memorizing apparatus.

11. The portable telephone set of claim 10, further including:
a controller inhibiting a start of ringing in response to an incoming call from said memorizing apparatus, and wherein a person initiates a backup control request by entering the code and the number of said portable telephone set from another telephone set or communication device.

12. A portable telephone being able to communicate with a memorizing apparatus via base stations in a network, comprising:
a receiving unit receiving an incoming call via one of said base stations from said memorizing apparatus in response to a backup control request, which includes a code and a number of said portable telephone;
a transmitting unit transmitting information to said memorizing apparatus having a memory for memorizing said information in said memorizing apparatus; and
a controller inhibiting a start of ringing in response to an incoming call from said memorizing apparatus.

* * * * *